(12) United States Patent
Tao et al.

(10) Patent No.: US 10,316,963 B2
(45) Date of Patent: Jun. 11, 2019

(54) PRESSURE SENSOR RATIONALITY DIAGNOSTIC FOR A DUAL CLUTCH TRANSMISSION

(71) Applicant: GM GLOBAL TECHNOLOGY OPERATIONS LLC, Detroit, MI (US)

(72) Inventors: Xuefeng T Tao, Northville, MI (US); Jeryl McIver, Inkster, MI (US); Leo P Dion, Flint, MI (US); Greg Perantoni, Fenton, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 100 days.

(21) Appl. No.: 15/496,626

(22) Filed: Apr. 25, 2017

(65) Prior Publication Data

US 2018/0306317 A1    Oct. 25, 2018

(51) Int. Cl.
| | | |
|---|---|---|
| G01M 13/02 | (2019.01) |
| F16H 61/12 | (2010.01) |
| F15B 1/02 | (2006.01) |
| F15B 1/033 | (2006.01) |
| F16H 61/00 | (2006.01) |
| F16H 61/30 | (2006.01) |

(52) U.S. Cl.
CPC ............. *F16H 61/12* (2013.01); *F15B 1/024* (2013.01); *F15B 1/033* (2013.01); *F16H 61/0021* (2013.01); *F16H 61/30* (2013.01); *F15B 2201/51* (2013.01); *F16H 2061/0034* (2013.01); *F16H 2061/1212* (2013.01); *F16H 2061/1284* (2013.01); *F16H 2061/305* (2013.01)

(58) Field of Classification Search
USPC ................ 73/115.02, 115.03, 115.04, 116.04
See application file for complete search history.

(56) References Cited

U.S. PATENT DOCUMENTS

| | | | | |
|---|---|---|---|---|
| 2011/0264339 A1* | 10/2011 | Wang | .................. | F16D 48/0206 701/53 |
| 2012/0029777 A1* | 2/2012 | Tao | ...................... | F16H 61/0213 701/60 |
| 2012/0137806 A1* | 6/2012 | Moorman | ........... | F16H 61/0206 74/340 |
| 2012/0138408 A1* | 6/2012 | Moorman | ........... | F16H 61/2807 192/48.601 |
| 2012/0144946 A1* | 6/2012 | Lundberg | ............ | F16H 61/0251 74/473.11 |
| 2012/0145504 A1* | 6/2012 | Moorman | ........... | F16H 61/0403 192/3.58 |
| 2013/0179046 A1* | 7/2013 | Nassouri | ................... | F15B 1/08 701/60 |

(Continued)

*Primary Examiner* — Eric S. McCall

(57) ABSTRACT

A pressure sensor rationality diagnostic for a dual clutch transmission includes a series of sensor tests. One such test includes charging an oil accumulator to a maximum pressure and storing the maximum pressure value. After performing a discharge pressure event and measuring the pressure value, the difference between the max pressure value and the discharge pressure value is calculated to determine if the difference is less than a predetermined threshold. If the difference is less than the predetermined threshold then at least one remedial action is performed which may include a driver alert or default charging mode. Additionally, similar sensor tests are performed to determine if faults exists and, if true, at least one remedial action is performed.

20 Claims, 6 Drawing Sheets

(56) References Cited

U.S. PATENT DOCUMENTS

| | | | |
|---|---|---|---|
| 2016/0003347 A1* | 1/2016 | Bartl | F16D 48/066 74/335 |
| 2016/0116061 A1* | 4/2016 | Ammler | F16H 61/0021 701/51 |
| 2018/0023701 A1* | 1/2018 | Shin | F16D 48/0206 60/413 |

* cited by examiner

PRESSURE SENSOR RATIONALITY DIAGNOSTIC FOR A DUAL CLUTCH TRANSMISSION

FIELD

The present disclosure relates to dual clutch transmission control systems and, more particularly, to a pressure sensor rationality diagnostic for a dual clutch transmission.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A manual transmission drivetrain includes an internal combustion engine (ICE), a clutch and a manual transmission. The clutch engages with a flywheel on the ICE and transfers torque output of the engine to the manual transmission. Torque transfer from the ICE to the transmission is interrupted when a vehicle operator manually shifts between gears of the transmission. During a gear shift event, the clutch is disengaged (i.e. the ICE is disengaged from the transmission), a desired gear is manually selected, and the clutch is reengaged.

A dual-clutch transmission (DCT) drivetrain includes an ICE and a DCT (or semi-automatic transmission). The DCT includes two clutches, inner and outer transmission shafts, and two gear sets with respective gear shafts and/or lay shafts. As an example, the inner transmission shaft may be associated with a first gear set and controlled using a first clutch. The outer transmission shaft may be associated with a second gear set and controlled using a second clutch. The first gear set may include first, third and fifth gears. The second gear set may include second, fourth and sixth gears. By using two transmission shafts, a DCT drivetrain can provide uninterrupted torque transfer between the ICE and an output shaft of the DCT during gear shifts. This decreases shift times and improves fuel economy.

The DCT includes a type of energy storage device in the form of a hydraulic fluid (oil) accumulator which holds fluid under pressure until it is needed to cause the engagement of either the inner or outer clutch during a gear shift. The accumulator enables the hydraulic pressure system of the DCT to cope with extremes of demand using a less powerful pump, to respond more quickly to a temporary demand, and to smooth out pulsations.

An oil pressure sensor is in fluid communication with the hydraulic fluid accumulator for monitoring the oil pressure of the hydraulic system. It is appreciated that the fluid pressure of the hydraulic system has a direct impact on the timing and operation of shifting the transmission into a higher or lower gear when needed. Hydraulic pressures that are too high or too low can lead to during shifting can lead to the transmission working incorrectly and potentially causing damage to internal components during the shifting process. The transmission oil pressure sensor provides the means for detecting when hydraulic pressures are improper thus allowing the vehicle operator to be alerted to when service is needed. Thus, it is important to have a reliable means to determine if the oil pressure sensor has failed, or if the data being received from the sensor is inaccurate such that replacement is required.

SUMMARY

One or more exemplary embodiments address the above issue by providing a pressure sensor rationality diagnostic for a dual clutch transmission. Aspects include charging an accumulator to a maximum pressure and storing the maximum pressure value before a discharge; performing a discharge pressure event and measuring the discharge pressure value after the discharge is complete; determining if the difference between the max pressure value and the discharge pressure value is less than a predetermined threshold; and performing at least one remedial action when the difference is less than the predetermined difference threshold.

Another aspect includes determining and storing an average maximum pressure value prior to performing the discharge pressure event. And another aspect includes calculating absolute extremum values for the average maximum pressure value and the average discharge pressure value over a predetermined average pressure period. Still another aspect includes performing at least one remedial action when a difference between the average maximum pressure value and the average discharge pressure value is less than a predetermined threshold.

Yet still other aspects of the exemplary embodiment include turning off an accumulator charge motor and resetting a charge timer, and turning on the accumulator charge motor and starting the charge timer after the turning off the accumulator charge motor and resetting the charge timer. And another aspect includes performing at least one remedial action when the charge timer value is greater than a predetermined accumulator charge timer threshold.

Still another aspect includes determining and storing accumulator charge pressure upon turning on the accumulator charge motor. And yet another aspect includes calculating the difference between an actual accumulator charge pressure and the stored accumulator charge pressure after a predetermined accumulator charge period expires. And still another aspect includes performing at least one remedial action if the difference between the actual accumulator charge pressure and the stored accumulator charge is less than a predetermined charge pressure threshold or if the difference between the actual accumulator charge pressure and the stored accumulator charge is greater than the predetermined charge pressure threshold.

Another aspect includes measuring absolute extremum pressure values during a predetermined discharge period. And another aspect includes performing at least one remedial action if the difference between the absolute extremum pressure values measured during the predetermined discharge period is less than a predetermined difference of absolute extremum pressure values expected during the predetermined discharge period.

Further areas of applicability of the present disclosure will become apparent from the detailed description provided hereinafter. It should be understood that the detailed description and specific examples are intended for purposes of illustration only and are not intended to limit the scope of the disclosure. It is appreciated that although the exemplary embodiment describes the pressure sensor rationality diagnostic in view of a DCT that it may also be made applicable to other transmissions, including but not limited to, manuals, automatics, and CVTs.

BRIEF DESCRIPTION OF THE DRAWINGS

The present disclosure will become more fully understood from the detailed description and the accompanying drawings, wherein.

DETAILED DESCRIPTION

Figure 1:
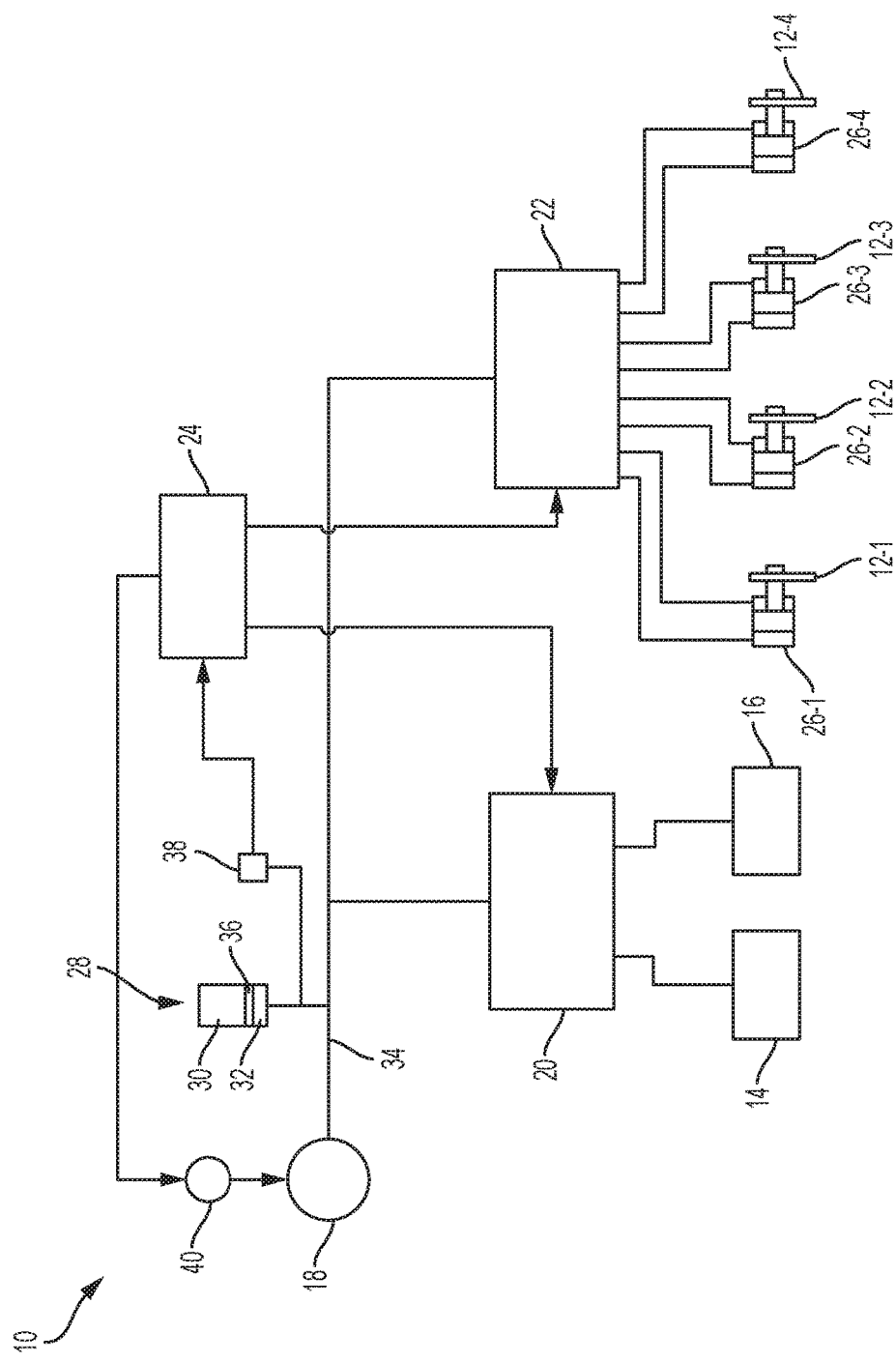
FIG. 1 is a functional block diagram of an exemplary oil flow for a (DCT) according to an exemplary embodiment.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

In FIG. 1, a DCT oil flow system 10 communicates with shift forks 12-1, 12-2, 12-3, and 12-4, referred to collectively as shift forks 12, which correspond to respective synchronizers (not shown) that bi-directionally translate the forks, by an actuator or piston (not shown), into at least two engaged positions and a neutral (or disengaged position). First and second clutch elements 14 and 16 are also in communication with the DCT oil flow system 10 and are operative to shift the transmission gears when actuated, e.g., the first clutch element may be operative to shift gears 1, 3, and 5 while the second element may be operative to shift gears 2, 4, and 6.

An electric pump 18 is in fluid communication with clutch control solenoids 20 and shift rail control solenoids and valves 22. The DCT control module 24 controls operation of the clutch control solenoids 20 and the shift rail control solenoids and valves 22. The electric pump 18 applies fluid pressure to actuate the first and second clutch elements 14, 16 via clutch control solenoids 20. Conversely, the electric pump 18 applies fluid pressure to actuate pistons 26-1, 26-2, 26-3, and 26-4, referred to collectively as pistons 26, via the shift rail control solenoids and valves 22. The pistons 26 actuate respective ones of the shift forks 12.

The DCT oil flow system 10 includes an accumulator 28. For example only, the accumulator 28 may be a nitrogen charged accumulator. The accumulator 28 includes a first chamber 30 that contains a pressurized gas such as nitrogen and a second chamber 32 that contains hydraulic fluid (e.g. transmission oil) and is in fluid communication with hydraulic (e.g. oil) line 34. The accumulator 28 includes a floating piston 36. The accumulator 28 stores the oil in the second chamber 32 under pressure exerted by the gas in the first chamber 30 on the floating piston 36.

The first chamber 30 is charged to provide a desired pressure on the oil contained in the second chamber 32. The DCT control module 24 measures and/or estimates pressure of the accumulator 28. For example, the DCT control module 24 may communicate with a pressure sensor 38. The DCT control module 24 determines a pre-charge pressure (i.e. a pressure at or before vehicle startup) and dynamic pressure estimates of the accumulator during vehicle operation. The DCT control module 24 turns a pump motor 40 on and off based on the pressure estimates, previously measured pre-charge pressures, and other system measurements and/or estimates, including, but not limited to, an oil volume estimate, system temperatures, and various vehicle operating modes.

Figure 2A:
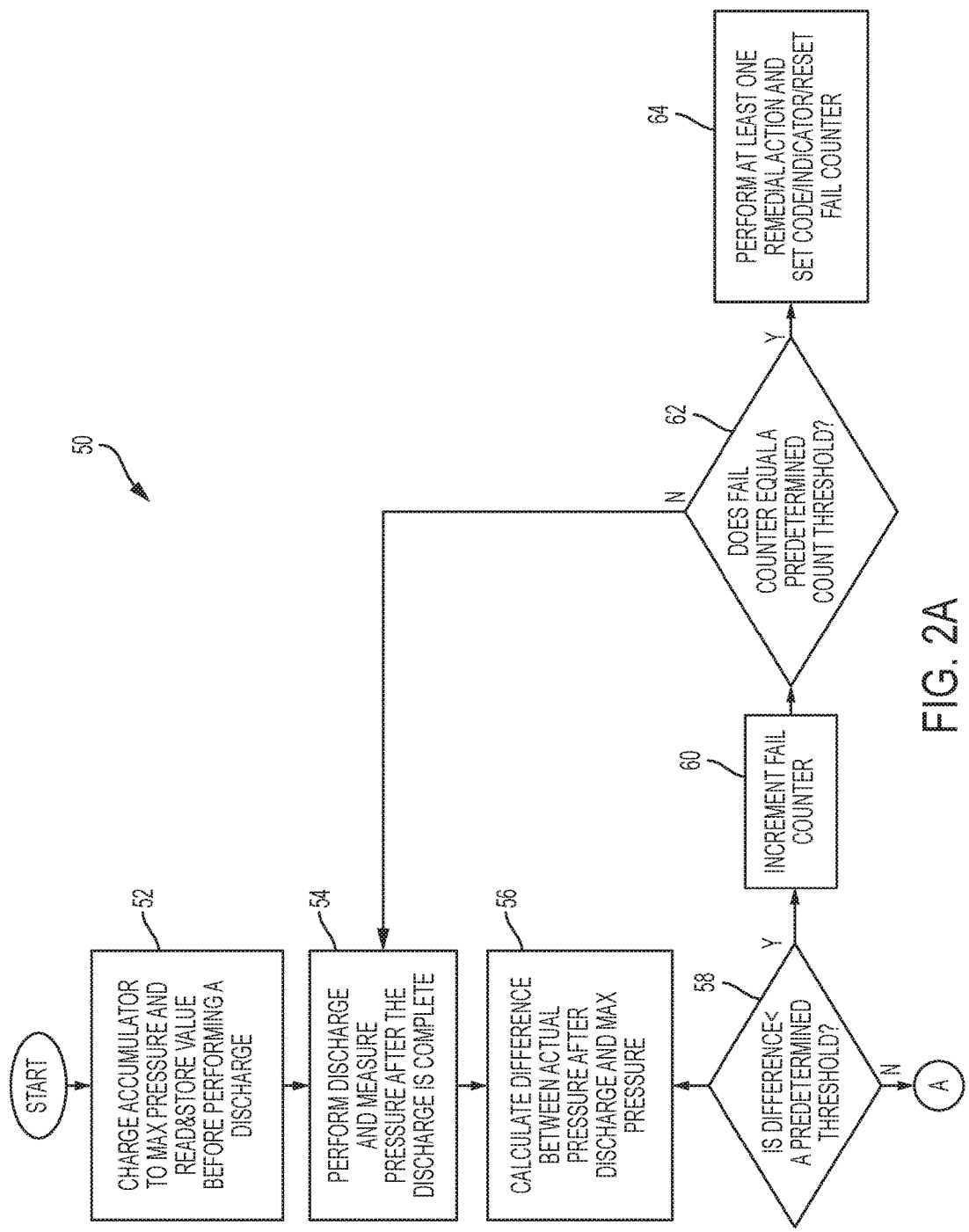
FIG. 2a is an algorithm for a pressure sensor rationality diagnostic for a DCT in accordance with the exemplary embodiment.

Referring now to FIG. 2a, an algorithm 50 for a pressure sensor rationality diagnostic for a DCT in accordance with the exemplary embodiment is provided. It is appreciated that the below described algorithm is intended to provide rationality tests as a means to reduce the events of concluding false failures of the DCT oil pressure sensor.

At block 52, the method begins with activating the electric pump 18 and pump motor 40 for charging the fluid accumulator 28 to a maximum pressure and then reading and storing the pressure value in the DCT control module 24, or other module suitable for such purposes, prior to performing a discharge event. Next, after having read and stored the maximum pressure charge of the fluid accumulator 28, at block 54 the method continues with performing a discharge event and then measuring the actual accumulator 28 pressure after the discharge event is complete.

At block 56, the method then calls for calculating the difference between the actual pressure after the discharge event and the maximum accumulator pressure value stored in the DCT control module 24. It is appreciated that all calculations, counters, timers, and the entire algorithm itself, are stored in and executed by the DCT control module 24 or similar module suitable for such purposes.

Figure 2B:
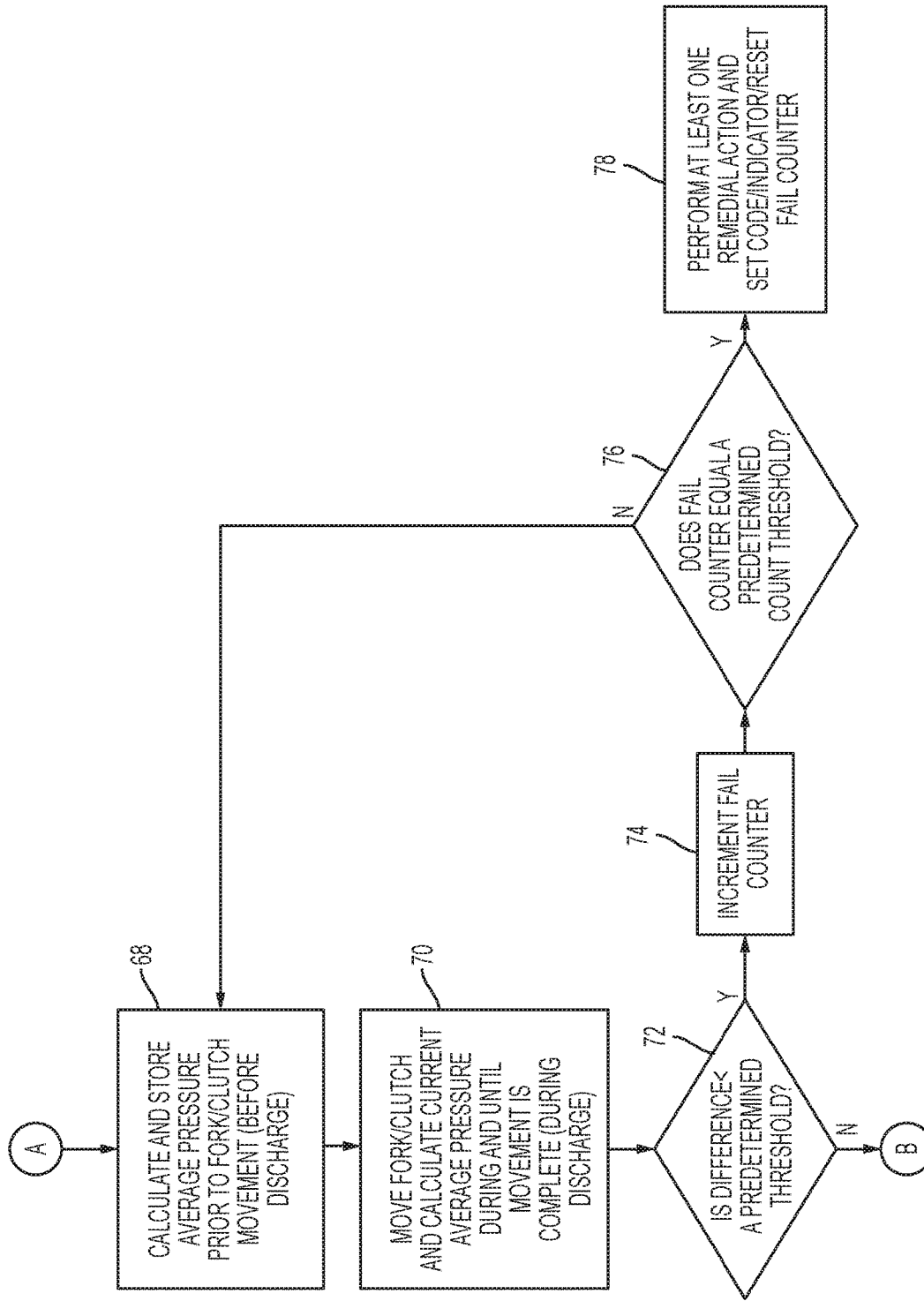
FIG. 2b is a continuation of the algorithm for a pressure sensor rationality diagnostic for a DCT in accordance with the exemplary embodiment.

At block 58, if the difference between the actual pressure after discharge and the maximum pressure is less than a predetermined threshold then the method moves to block 60 where a fail counter is incremented. Then, at block 62, if the fail counter is not equal to a predetermined count threshold, e.g., 2 or 3, then the method returns to block 54 to continue the test steps. Otherwise, the method moves to block 64 for performing at least one remedial action which includes, but not limited to, turning on a service indicator light/alarm, setting a fault code in a controller (DCT module), resetting the fail counter, and/or commanding the DCT oil flow system 10 to operate in a default mode. In default mode, the DCT oil flow system 10 will turn the pump ON at a constant speed for the remainder of the drive cycle, and may re-trigger the system to default in subsequent drive cycles until the vehicle is serviced. If at block 58 it is determined that the difference between the actual pressure and the maximum pressure is not less than a predetermined threshold then the method moves to block 68. Referring now to FIG. 2b, at block 68, the method continues after charging the accumulator 28 to maximum pressure with calculating and storing the average pressure prior to any fork 12 or clutch element (14, 16) movement. At block 70, the method continues with moving the forks/clutch elements, i.e., in discharging, and then calculating the average pressure during and until the movements are complete. Whenever the forks 12 or clutch elements are actuated the accumulator pressure should decrease/discharge by an appropriate amount to drive the gear shift event.

At block 72, the method continues with determining if the difference between the average pressure value prior to the discharge event (fork or clutch movement) and the average pressure value during the discharge event is less than a predetermined pressure threshold value. If so, then at block 74, a fail counter is incremented, and then at block 76, the method determines if the fail counter equals a predetermined count threshold. If not, the method returns to block 68 to repeat the process steps for this test. If the fail counter does equal the predetermined count threshold then the method continues at block 78 where at least one remedial action is performed as noted above. At block 72, if the difference between the average pressure value prior to the discharge event and the average pressure value during the discharge event is not less than a predetermined pressure threshold value then the method moves to block 80.

Figure 2C:
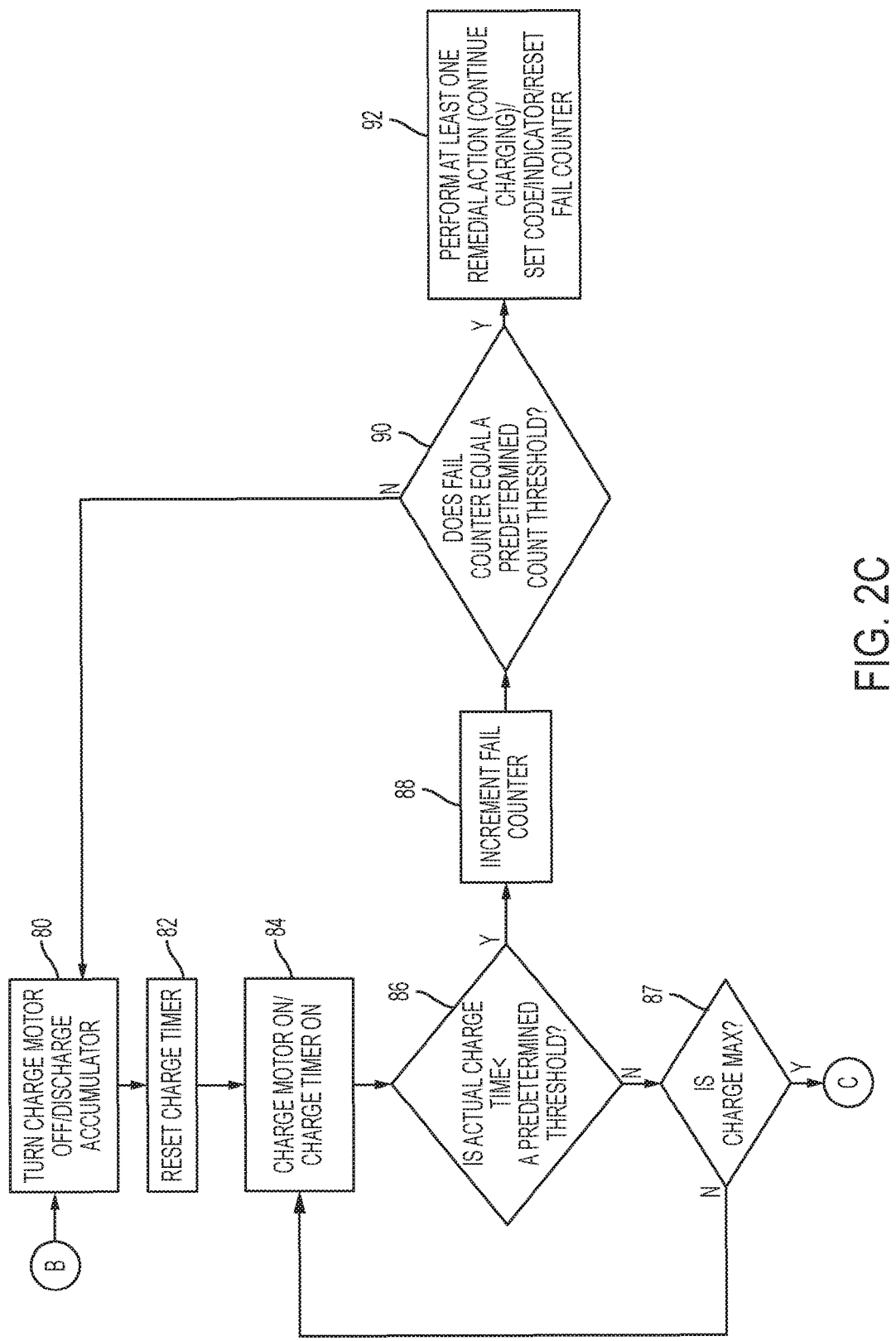
FIG. 2c continues further the algorithm for a pressure sensor rationality diagnostic for a DCT.

Referring now to FIG. 2c, at block 80, the method continues with turning the electric pump 18 and pump motor 40 OFF and letting the accumulator 28 discharge. At block 82, a charge timer (not shown) is reset to zero (0). The charge timer tracks the time it takes for the accumulator 28 to charge. At block 84, the electric pump 18, the pump motor 40 and the charge timer are turned ON to start charging the accumulator 28 while tracking time with the charge timer.

At block 86, the method continues with determining if the actual time it takes to fully charge the accumulator 28 is greater than a predetermined charge time threshold. At block 87, the method determines if the accumulator 28 is fully charged and, if not, the method returns to block 84 to continue the charging process. At block 88, if it is determined at block 86 that the actual time to charge the accumulator is greater than the predetermined time threshold then a fail counter is incremented. At block 90, if the fail counter does not equal a predetermined count threshold then the method returns to block 80 to repeat the test steps a second time. If the fail counter equals the predetermined count threshold then, at block 92, at least one remedial action is performed as noted above. Again from block 86, if the actual time it takes to fully charge the accumulator is not greater than a predetermined charge time threshold and the accumulator is fully charged then the method continues at block 94.

Figure 2D:
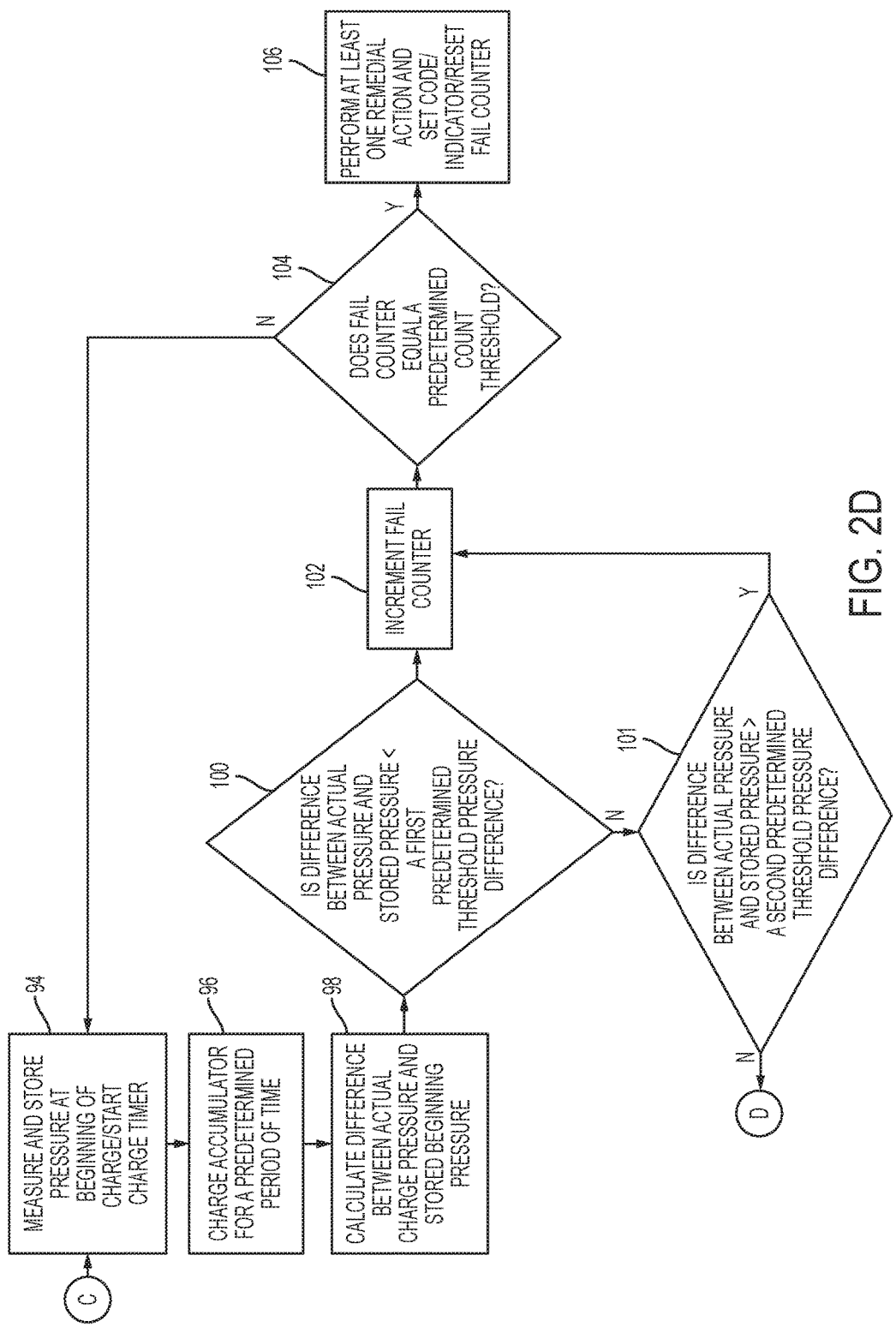
FIG. 2d again continues the algorithm for a pressure sensor rationality diagnostic for a DCT in accordance with the exemplary embodiment.

Referring now to FIG. 2d, at block 94, the method continues with measuring and storing accumulator 28 pressure at the beginning of a charge while starting the charge timer. At block 96, the accumulator is charged for a predetermined period of time. Then, at block 98, the method continues with calculating the difference between the actual accumulator pressure after the predetermined charge period expires and the stored accumulator pressure at the beginning of the charge.

At block 100, if the difference between the actual accumulator pressure after the predetermined time period expires and the accumulator pressure stored at the beginning of the charge event is less than a predetermined pressure difference threshold then a fail counter is incremented at block 102. At block 104, if the fail counter does not equal two (2) then the method returns to block 94 to repeat the process steps. If the fail counter equals two (2) then, at block 106, at least one remedial action is performed as noted above. From block 100, if the difference between the actual accumulator pressure and the accumulator pressure stored at the beginning of the charge event is not less than a first predetermined pressure difference threshold then, at block 101, the method continues with determining if the difference between the actual accumulator pressure after the predetermined time period expires and the accumulator pressure stored at the beginning of the charge event is greater than a second predetermined pressure difference threshold. If so, then the method moves to block 102 for incrementing the fail counter. If not, then the method moves to block 108.

Figure 2E:
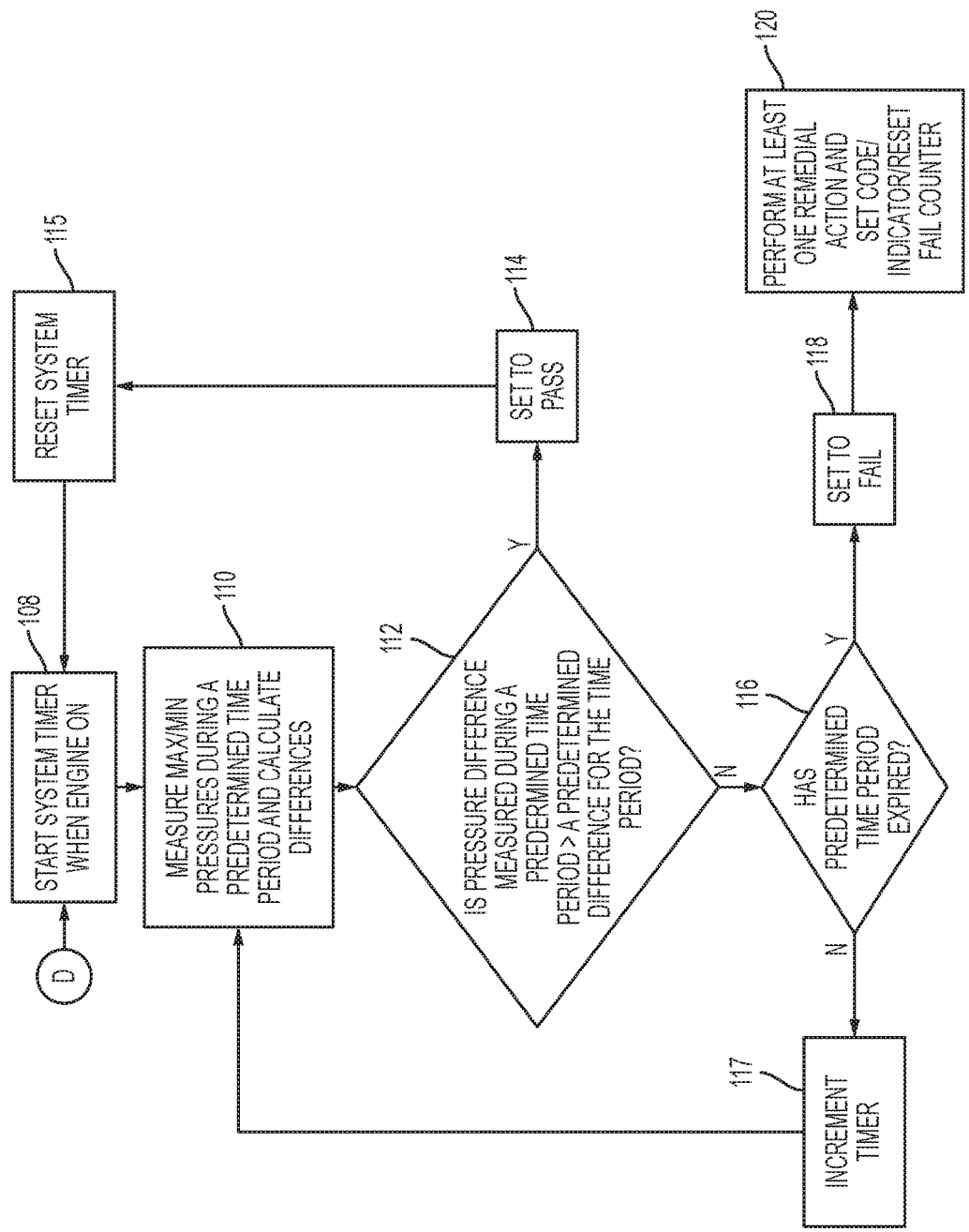
FIG. 2e continues further the algorithm for a pressure sensor rationality diagnostic for a DCT in accordance with the exemplary embodiment.

Referring now to FIG. 2e, at block 108, the method continues by starting a system timer when the engine is turned on regardless of charging or discharging the accumulator (i.e., anytime during DCT vehicle operations). Then, at block 110, the method continues with measuring absolute extremum pressure values (absolute maximum and absolute minimum values measured during a predetermined time period) and calculating the difference between them. At block 112, if the difference between the absolute extremum values measured during a predetermined time period is greater than a predetermined difference for the predetermined time period then, at block 114, the test is set to pass and the method continues at block 115 with resetting the system timer and then goes back to block 108 to re-start the timer. If the difference between the absolute extremum values measured during the predetermined time period is not greater than the predetermined difference for the predetermined time period then, at block 116, the method determines if the predetermined time period has expired. If not, then the method moves to block 117 where the system timer is incremented and then returns to block 110 to continue measuring for the absolute extremum values. If the predetermined time period has expired then, at block 118, the test is set to fail. Thereafter, the method may be caused to return to block 108 to repeat the test or, at block 120, at least one remedial action is performed as noted above.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An accumulator oil pressure sensor rationality diagnostic for a transmission comprising:
    charging an accumulator to a maximum pressure and storing the maximum pressure value before a discharge;
    performing a discharge pressure event and measuring the discharge pressure value after the discharge is complete;
    determining if the difference between the max pressure value and the discharge pressure value is less than a predetermined threshold; and
    performing at least one remedial action when the difference is less than the predetermined difference threshold.

2. The method of claim 1 further comprising determining and storing an average maximum pressure value prior to performing a discharge pressure event.

3. The method of claim 2 wherein determining the average maximum pressure value and an average discharge pressure value further comprises calculating absolute extremum values for the average maximum pressure value and the average discharge pressure value over a predetermined average pressure period.

4. The method of claim 3 further comprising performing at least one remedial action when a difference between the average maximum pressure value and the average discharge pressure value is less than a predetermined threshold.

5. The method of claim 1 further comprising turning off an accumulator charge motor and resetting a charge timer after charging the accumulator to a maximum pressure and storing the maximum pressure value.

6. The method of claim 5 further comprising turning on the accumulator charge motor and starting the charge timer after the discharge pressure event and measuring the discharge pressure value has been performed.

7. The method of claim 6 further comprising performing at least one remedial action when the charge timer value is greater than a predetermined accumulator charge timer threshold.

8. The method of claim 6 further comprising determining and storing accumulator charge pressure upon turning on the accumulator charge motor.

9. The method of claim 8 further comprising calculating the difference between an actual accumulator charge pressure and the stored accumulator charge pressure after a predetermined accumulator charge period expires.

10. The method of claim 9 further comprising performing at least one remedial action if the difference between the actual accumulator charge pressure and the stored accumulator charge is less than a predetermined charge pressure threshold or if the difference between the actual accumulator charge pressure and the stored accumulator charge is greater than the predetermined charge pressure threshold.

11. The method of claim 6 further comprising measuring absolute extremum pressure values during a predetermined discharge period after the discharge pressure event has been performed.

12. The method of claim 11 further comprising performing at least one remedial action if the difference between the absolute extremum pressure values measured during the predetermined discharge period is less than a predetermined difference of absolute extremum pressure values expected during the predetermined discharge period.

13. An accumulator oil pressure sensor rationality diagnostic for a transmission comprising:
    charging an accumulator to a maximum pressure and storing the maximum pressure value before a discharge;
    determining and storing an average maximum pressure value prior to performing a discharge pressure event after the discharge is complete;
    performing the discharge pressure event and measuring the discharge pressure value;
    determining and storing an average discharge pressure value after performing the discharge pressure event;
    determining if the difference between the max pressure value and the discharge pressure value is less than a predetermined threshold; and
    performing at least one remedial action when the difference is less than the predetermined difference threshold.

14. The method of claim 13 wherein determining the average maximum pressure value and the average discharge pressure value further comprises calculating absolute extremum values for the average max pressure value and the average discharge pressure value over a predetermined average pressure period.

15. The method of claim 13 further comprising performing at least one remedial action when a difference between the average maximum pressure value and the average discharge pressure value is less than a predetermined threshold.

16. The method of claim 13 further comprising turning off an accumulator charge motor and resetting a charge timer after charging the accumulator to a maximum pressure and storing the maximum pressure value.

17. The method of claim 16 further comprising turning on the accumulator charge motor and starting the charge timer after the discharge pressure event and measuring the discharge pressure value has been performed.

18. The method of claim 17 further comprising performing at least one remedial action when the charge timer value is greater than a predetermined accumulator charge timer threshold.

19. The method of claim 18 further comprising determining and storing accumulator charge pressure upon turning on the accumulator charge motor.

20. The method of claim 19 further comprising calculating the difference between an actual accumulator charge pressure and the stored accumulator charge pressure after a predetermined accumulator charge period expires.

\* \* \* \* \*